W. J. PARSONS.
COMBINED LAWN TRIMMER AND SOD CUTTER.
APPLICATION FILED SEPT. 17, 1917.
1,266,617.
Patented May 21, 1918.
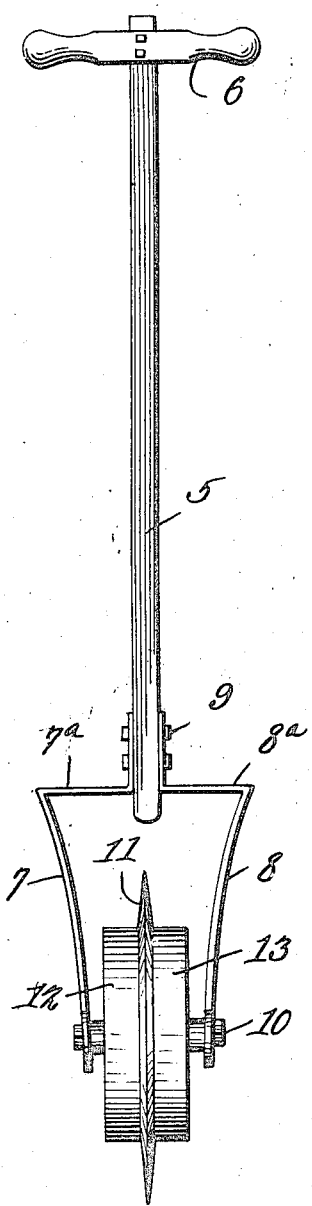
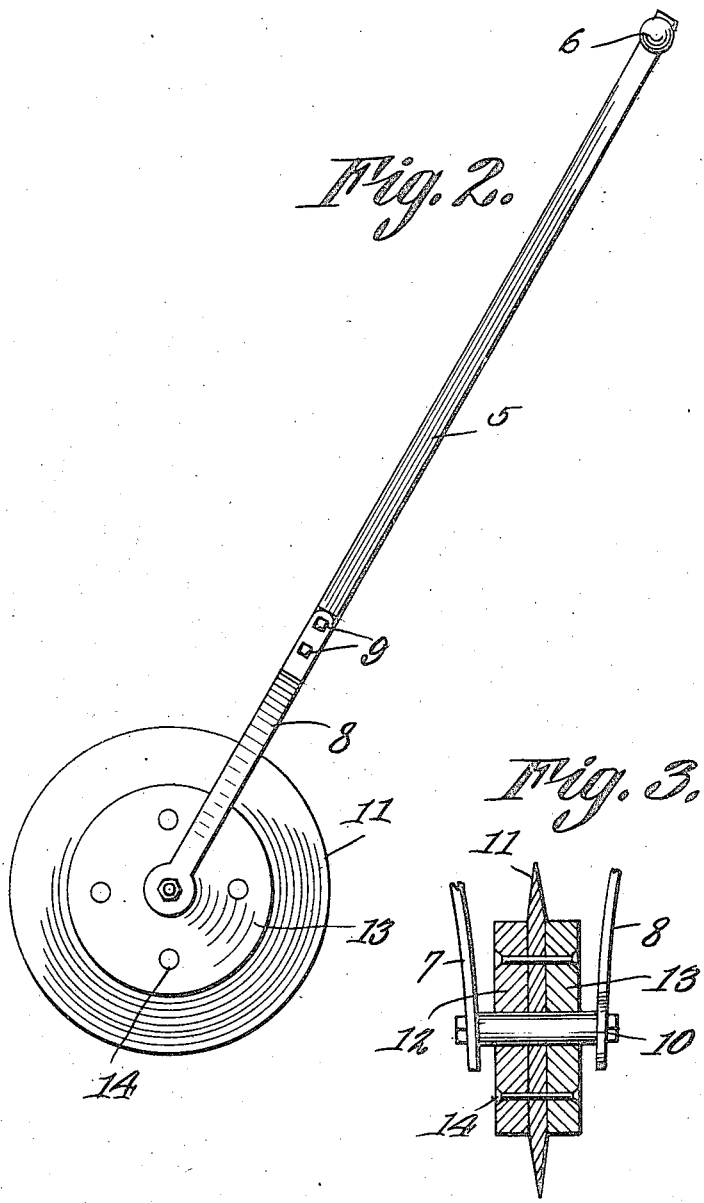
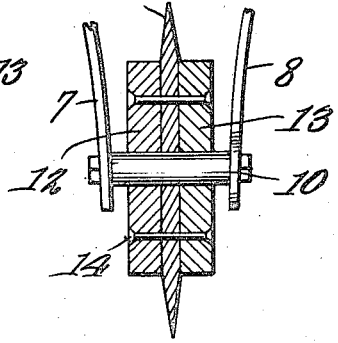

UNITED STATES PATENT OFFICE.

WARREN J. PARSONS, OF HUNTINGTON, WEST VIRGINIA.

COMBINED LAWN-TRIMMER AND SOD-CUTTER.

1,266,617. Specification of Letters Patent. Patented May 21, 1918.

Application filed September 17, 1917. Serial No. 191,827.

*To all whom it may concern:*

Be it known that I, WARREN J. PARSONS, a citizen of the United States of America, and resident of Huntington, in the county of Cabell and State of West Virginia, have invented certain new and useful Improvements in Combined Lawn-Trimmers and Sod-Cutters, of which the following is a specification.

This invention relates to sod cutters or trimmers and has for its object the provision of novel means for causing a rotary cutter to penetrate the soil or sod during its travel, the said invention furthermore having for its object the provision of means whereby manual pressure may be applied for augmenting or accentuating the cutting action.

A still further object of this invention is to provide a cutter of the character indicated which comprises comparatively few and inexpensive parts which can be readily assembled and which will prove durable and efficient.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a front view of the cutter embodying the invention;

Fig. 2 illustrates a side elevation thereof; and

Fig. 3 illustrates a sectional view of a fragment of the rotating member with the bearing thereof in elevation.

In these drawings 5 denotes the shank or bar of any appropriate material or construction having a handle 6 attached to it near one end, the said shank having brackets 7 and 8 attached to it by fastenings 9 such as bolts or the like. Each of the brackets comprises the portion which is attached to the shank or bar and the brackets 7 and 8 have outwardly extending portions 7ª and 8ª respectively, which constitute shoulders for the application of foot pressure in forcing the cutter (to be presently described) into the sod or soil.

The lower ends of the brackets have apertures for the reception of a journal 10 on which the cutter is rotatable and the said cutter comprises a disk 11 which is bolted or otherwise secured between the two plates 12 and 13, which plates are relatively wide and heavy so that the additional weight occasioned by their presence serves to cause the cutter to operate effectively in most instances without the application of pressure, although under some conditions, the application of pressure in the manner heretofore indicated is a desirable adjunct to the successful manipulation and operation of the implement.

The combined disk and plates are preferably mounted on the journal so as to have limited lateral motion produced by the presence of a clearance between the plates and the brackets. This relation of parts permits the disk to slide freely in either direction, depending on the side at which pressure is applied in cutting the grass at the edge of a lawn and in proximity to or against a densely packed wall or retaining wall. It has been found in practice that the friction of the blade against the edges of cement or stone walks or walls when held and propelled at the angle at which the best results in cutting are attained has the effect of sharpening the cutting edge of the blade and renders the same self-sharpening.

It has also been found in practice that a cutter made in accordance with this invention is effective for cutting sod which is to be taken up and relaid, the solid metal plates lending the weight necessary to cause the cutter to embed itself in the sod while being rotated.

The plates 12 and 13 and the disk 11 are connected together by fastenings 14 such as bolts although any other suitable means may be utilized for connecting these parts.

I claim

1. In a lawn trimmer and sod cutter, brackets having outwardly extending portions constituting shoulders for the application of pressure, a member to which the said brackets are connected for manipulating the cutter, a journal carried by the said brackets, a cutter comprising a blade and weighted plates connected together, the said blade extending beyond the edges of the plates, and means for mounting the cutter and plates on the journal whereby the same is transversely movable with relation to the journal.

2. In a lawn trimmer and sod cutter, brackets having shoulders for receiving pressure, a member to which the brackets are connected for manipulating the cutter, a cutter blade, circular plates constituting weights secured at each side of the said cutter and a journal carried by the said brackets on which the plates and blade are loosely mounted.

WARREN J. PARSONS.